United States Patent [19]

Michaelis et al.

[11] Patent Number: 5,189,437
[45] Date of Patent: Feb. 23, 1993

[54] MANUFACTURE OF NOZZLES FOR INK JET PRINTERS

[75] Inventors: A. John Michaelis, Glen Ellyn, Ill.; Anthony D. Paton; Stephen Temple, both of Cambridge, England

[73] Assignee: XAAR Limited, Cambridge, England

[21] Appl. No.: 769,583

[22] Filed: Oct. 2, 1991

Related U.S. Application Data

[63] Continuation of Ser. No. 470,446, Jan. 19, 1990, abandoned, which is a continuation of Ser. No. 246,462, Sep. 19, 1988, abandoned.

[30] Foreign Application Priority Data

Sep. 19, 1987 [GB] United Kingdom ............... 8722087

[51] Int. Cl.⁵ .......................... B41J 2/16; B41J 2/045
[52] U.S. Cl. .............................. 346/1.1; 219/121.7; 219/121.71; 346/140 R
[58] Field of Search ............. 346/1.1, 140 R, 75; 219/121.7, 121.71; 29/890.1

[56] References Cited

U.S. PATENT DOCUMENTS

| | | | |
|---|---|---|---|
| 4,157,935 | 6/1979 | Solyst | 156/644 |
| 4,246,076 | 1/1981 | Gardner | 204/11 |
| 4,312,009 | 1/1982 | Lange | 346/140 |
| 4,317,124 | 2/1982 | Shirato | 346/140 |
| 4,450,455 | 5/1984 | Sugitani | 346/140 |
| 4,502,054 | 2/1985 | Brescia | 346/140 X |
| 4,587,534 | 5/1986 | Saito | 346/140 R |
| 4,593,296 | 6/1986 | Dagna | 346/140 |
| 4,640,382 | 2/1987 | Hartmann | 219/121.71 X |
| 4,644,126 | 2/1987 | Schumacher | |
| 4,694,548 | 9/1987 | Ehrfeld | 29/157 C |

OTHER PUBLICATIONS

Kords, Donald N.; Removal of Ink Deposits Located Near the Nozzles of an Ink Jet Device; Xerox Disclosure Journal; vol. 9, No. 4 Jul./Aug. 1985, pp. 247-248.

Primary Examiner—Joseph W. Hartary

[57] ABSTRACT

A method of manufacturing one or more nozzles for an ink jet printhead initially comprises bonding a nozzle plate to the ink ejection end of the printhead. A mask is then secured in contact with the nozzle plate, the mask having a plurality of apertures each defining a respective nozzle exit. Laser radiation applied to the mask exposes the areas defined by the apertures to ablate the plate material between the nozzle exits on the external surface of the plate and corresponding nozzle inlets on the opposite surface of the plate. The assembly comprising the printhead, plate and mask is rocked during the exposure step to increase the area of the nozzle inlet relative to its outlet. Also, prior to the nozzle formation step, one or more ink troughs may be provided for supplying an external source of ink for each nozzle. The ink troughs, which may be formed using laser ablation techniques similar to those used in the formation of the nozzles, facilitate a continuous, positive flow of ink through the nozzles.

38 Claims, 4 Drawing Sheets

MANUFACTURE OF NOZZLES FOR INK JET PRINTERS

This application is a continuation of application Ser. No. 470,446, filed Jan. 19, 1990, abandoned Nov. 20, 1991 which is a continuation of application Ser. no. No, filed Sep. 19, 1988 abandoned Apr. 24, 1990.

CROSS-REFERENCE TO RELATED APPLICATIONS

The subject matter of this application is related to the subject of copending applications Ser. Nos. 140,617 now U.S. Pat. No. 4,887,100 and 140,764, now U.S. Pat. No. 4,879,568, both filed Jan. 4, 1988 and both entitled Droplet Deposition Apparatus, in the names of A. John Michaelis et al and W. Scott Bartky et al respectively. Both reference applications, which are assigned to the assignee of the present application, are incorporated herein by reference.

BACKGROUND OF THE INVENTION

The present invention generally relates to nozzles for ink jet printers and their method of manufacture, and particularly concerns the manufacture of nozzle plates having a multiplicity of individual nozzles.

It has been suggested that certain plastics, particularly low surface energy plastics such as polyethylene, polypropylene or fluorinated polymers be employed in the manufacture of nozzles for ink jet printers. See, for example, IBM Technical Disclosure Bulletin 25.8 Jan 1983, p4371. The claimed advantage of using such materials is that the outer face, having a relatively low surface energy, inhibits the spread of aqueous inks in particular. But an associated disadvantage of such nozzle materials is that the ink has an adverse contact angle to and therefore does not wet the surface of the nozzle bore. The suction which draws ink to the exterior surface of the nozzle during operation of the printer is consequently diminished or absent. This suction contributes to ink drop acceleration during ejection of a drop of ink in a drop-on-demand printer and also assists the ink replenishment process which refills the nozzle with ink after printing. For these reasons, nozzles made of low energy polymer are not well suited for use in drop-on-demand printers.

It has been discovered, however, that other plastics, which have not heretofore been proposed for the purpose, are particularly well suited for the manufacture of nozzles for ink jet printers, particularly drop-on-demand ink jet printers. In addition to the selection of an appropriate material, a suitable technology must also be provided to form the nozzles in the material. This technology would preferably be capable of simultaneously forming multiple nozzles in a nozzle plate or the like, wherein the nozzles are in precise registration with the ink ejection channels of the printhead of an ink ejection printer. Laser ablation is a technology particularly well suited for these purposes. The controlled ablation of solid materials using a pulsed UV laser is well known in the art. See, for example, International Application No. 59-154826 which discloses the use of a high energy beam such as a laser to form nozzles in a resin film. Despite this disclosure, the use of lasers in the formation of printhead nozzles is not widely practiced. It is believed that this is at least partially due to the failure of the prior art to disclose techniques for forming ink jet nozzles of appropriate configuration.

It would additionally be highly advantageous to provide a continuous, positive ink flow through the nozzles of a drop-on-demand ink jet printer during printing. Applicants are unaware of any prior art disclosures teaching the use of such positive flow systems.

OBJECTS OF THE INVENTION

It is therefore a basic object of the present invention to provide an improved ink jet printer nozzle and a method for manufacturing the nozzle.

It is a further object of the invention to provide an improved ink jet printer nozzle assembly and a method for manufacturing the assembly, wherein the nozzles are made from a material, preferably plastic, which does not adversely affect the operating characteristics of the printer.

It is yet a further object of the invention to provide a novel nozzle assembly and a method for manufacturing the assembly wherein the nozzles are formed in a tapered configuration especially well suited for use in association with the printhead of an ink jet printer, particularly a drop-on-demand ink jet printer.

It is still another object of the invention to provide a method for manufacturing a nozzle plate having a multiplicity of individual nozzles which are in precise registration with the ink ejection channels of an ink jet printhead.

BRIEF DESCRIPTION OF THE DRAWINGS

These and other objects and advantages of the invention will be apparent on reading the following description in conjunction with the drawings, in which.

DESCRIPTION OF THE PREFERRED EMBODIMENTS

Figure 1:
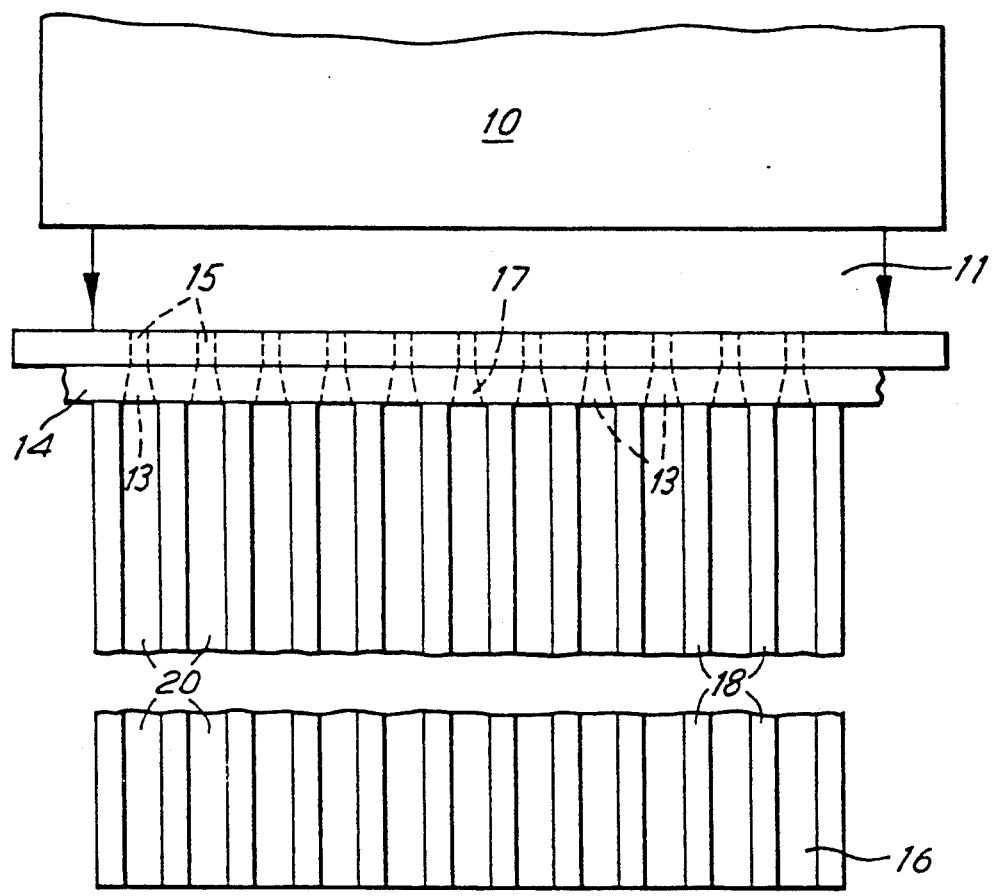
FIG. 1 diagrammatically illustrates a process for manufacturing a nozzle plate for an ink jet printhead according to the present invention.

Referring to FIG. 1, reference numeral 16 identifies an ink jet printhead, such as a drop-on-demand ink jet printhead of the type fully disclosed in the copending cross-referenced applications. While the present invention has particular utility in connection with such printheads, printheads of other construction and operation may also benefit by the teachings of the invention. With further reference to FIG. 1, printhead 16 comprises a plurality of spaced elongate ink cavities or channels 20 separated by a plurality of elongate actuating walls 18. As explained fully in the copending applications, actuating walls 18 are operable in shear mode in response to applied electrical signals for imparting pressure pulses to the ink in channels 20 for causing ejection of ink droplets through a plurality of nozzles 13, each of the nozzles being in communication with a respective ink channel 20.

According to the invention, nozzles 13 are formed in a solid nozzle plate 14 which is bonded to printhead 16. Nozzle formation may take place prior to the bonding of nozzle plate 14 to printhead 16 or after it has been bonded thereto. In either case, to facilitate the manufacturing process, a contact mask 12 having a plurality of spaced apertures 15 is secured to the external surface of nozzle plate 14. Apertures 15, each of which defines the periphery of a respective nozzle exit on the external surface of nozzle plate 14, are arranged to couple ultraviolet (UV) radiation from a source 10 onto nozzle plate 14 to form nozzles 13. More particularly, source 1? preferably comprises an excimer laser which generates and applies a uniform collimated or parallel beam 11 of UV light of appropriate energy density per pulse onto contact mask 12. Apertures 15 of contact mask 12 expose nozzle plate 14 to the UV radiation thereby ablating the regions of the nozzle plate underlying the apertures, thus forming nozzles 13 through nozzle plate 14. In this manner, contact mask 12 provides for the concurrent exposure and formation of a line array of nozzles. By forming nozzles 13 after nozzle plate 14 is bonded to printhead 16, alignment of each nozzle 13 with a respective ink channel 20 of printhead 16 can be precisely controlled.

The material of which nozzle plate 14 is made is preferably a plastic or polymer whose surface energy after ablation has a high contact angle to and is thereby wetted by the ink solvent supplied from ink ejection channels 20. In particular, the material comprising nozzle plate 14 should have a surface energy after ablation exceeding that of the ink solvent. This permits for the efficient transfer of ink solvent from the ink channels 20 into the bores of nozzles 13. It is also advantageous to make nozzle plate 14 out of plastic since the threshold energy density required for ablation of plastic is relatively low. Suitable plastic materials, which are not attacked by the ink solvent may be selected from, for example, polyester terepthalate, polyamide, polyetherimide, polyethersulphone, polyetherketone, polycarbonate and cellulose acetate. The nozzle plate 14 may also comprise a solid material such as glass or metal, in which event the required ablation energy density is greater and ablation may have to be carried out in a vacuum.

As previously described, the nozzle plate 14 shown in FIG. 1 is bonded to an ink jet printhead 16, in particular a drop-on-demand printhead. The technique illustrated in the drawing of forming multiple nozzles 13 after the nozzle plate 14 is assembled and bonded to printhead 16 achieves a number of advantages. First, the axis 17 of each nozzle 13, which controls the relative direction of each ink jet, is very precisely controlled, being solely a function of the configuration of mask 12 and the uniformity of intensity and direction of the axis of collimation of the optical beam. Although, in accordance with the invention, nozzle plate 14 may be formed as a separate component before assembly, the subsequent process of locating and bonding the plate to printhead 16 may introduce some geometric variations in the axial direction between jets produced by nozzles 13. Also, the risk of causing nozzle blockage during the bonding of nozzle plate 14 is substantially avoided by ablating nozzles 13 after assembly and bonding of the nozzle plate.

An inherent feature of excimer laser ablation of plastics is that the walls of a structure ablated in plastic are found not to be parallel to the incident light beam, but rather taper inward. Typically, with energy levels appropriate for ablating plastic nozzle plate 14, a taper of about 5 degrees is obtained. This gradually reduces the section of the ablated structure from the working face. It is, however, advantageous for ink jet nozzles to be tapered in the opposite direction, being smaller in area at the exit end than at the inlet end. A nozzle which is tapered with its area increasing towards the outlet face, such as that naturally produced by laser ablation, is therefore considered undesirable. This disadvantage is overcome according to the present invention by rocking the assembly comprising printhead 16, nozzle plate 14 bonded thereto and adjacent contact mask 12 (or a suitable fixture holding nozzle plate 14 and contact mask 12) during nozzle ablation. In this manner, nozzles 13 are so formed as to have enlarged ink inlets without enlarging the nozzle exit at the same time.

Figure 2:
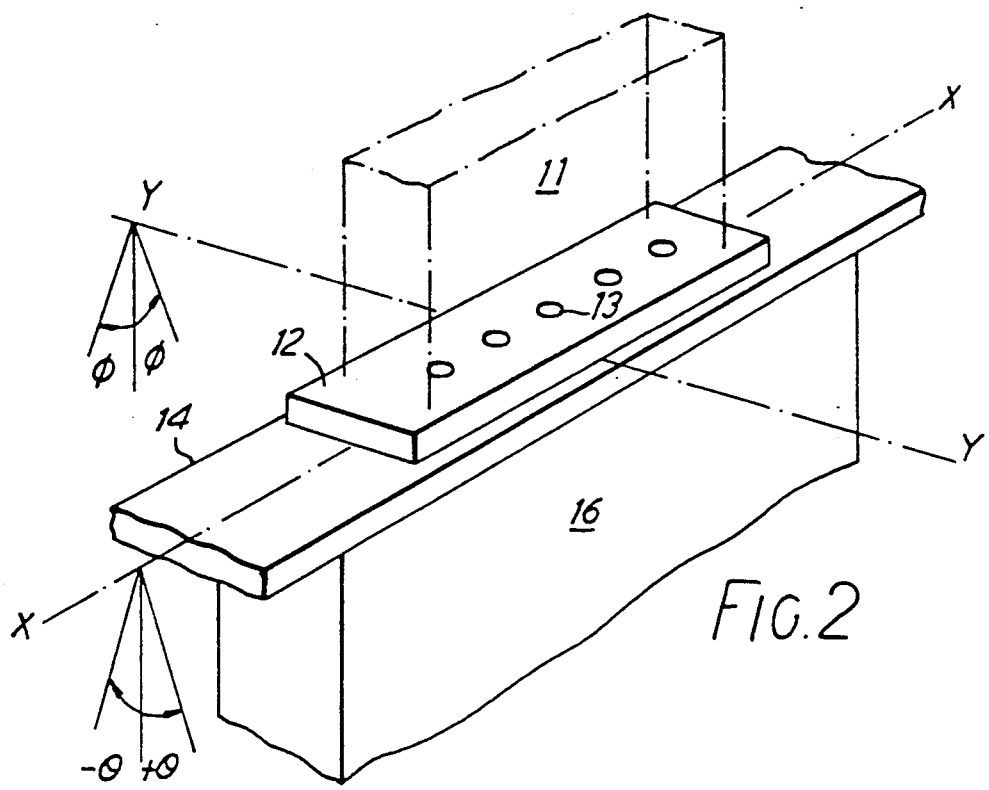
FIG. 2 is an enlarged perspective view of a portion of the arrangement illustrated in FIG. 1, and which in particular shows a method by which the nozzles formed in the plate of FIG. 1 are undercut according to the invention.
Figure 3:
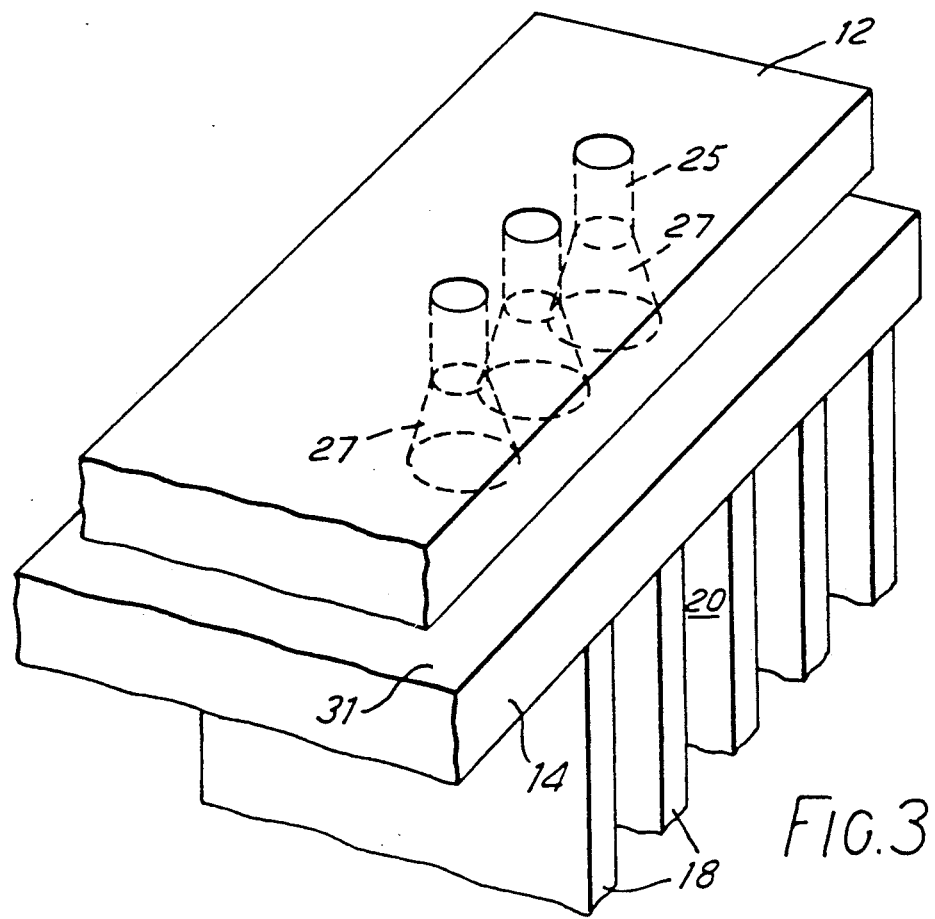
FIG. 3 is an enlarged perspective view similar to FIG. 2 and showing the undercut nozzles formed in the nozzle plate.

The method of rocking the assembly to undercut nozzles 13 is illustrated in FIG. 2. As shown in the drawing, the assembly comprising printhead 16, nozzle plate 14 and contact mask 12 can be rocked through either of the mutually perpendicular X or Y axes or can be simultaneously rocked about both axes. In particular, the assembly is preferably pivotally moved in simple harmonic motion about the respective axes, which are disposed in or substantially in a plane of plate 14 facing towards beam 11. In one embodiment of the invention, the assembly is rocked unequally about the X and Y axes so that a substantially circular exit hole 25 (see FIG. 3) exposed by a circular mask aperture 17 results in an elliptical, oblate or rectangular entry shape 27 whose major axis is in alignment with actuating walls 18 of printhead 16. It is particularly suitable when forming a line of nozzles 13 to rotate the assembly through a large angle of approximately +/− 30-40 degrees about the X axis joining the line of nozzles 13, and to rotate the assembly through a smaller angle of approximately +/− 10-20 degrees about the Y axis normal to the line of nozzles 13. This advantageously results in a nozzle 13 having an inlet shape 27 substantially larger in area than the nozzle exit 25 and permits closer spacing of adjacent nozzles 13 by matching the nozzle entry shape 2 to the channel profile of printhead 16.

Another advantage of rocking and undercutting nozzles 13, particularly in a drop-on-demand printer, so that the nozzle is tapered towards the exit face, is that the nozzle volume is increased compared with a nozzle that is not tapered by rocking during manufacture or one that has a parallel bore. By making the nozzle volume in excess of one drop volume of the drop size to be produced by the drop-on-demand printer in a comparatively thin nozzle plate, the probability of sucking air from outside the nozzle plate into ink cavity 20 behind the nozzle plate is substantially reduced during operation of the printer.

A further advantage of forming a nozzle tapered towards the exit, is that the inertance of the fluid mass in the nozzle, which is the factor controlling the rise time of the ink jet velocity in response to a pressure pulse, is reduced by a substantial factor. The viscous impedance or reactance of the nozzle which tends to reduce the ink flow velocity is similarly reduced by increasing the inlet area. As a consequence, a more viscous ink can be tolerated without excessive nozzle impedance.

As mentioned above, a particular benefit of rocking the printhead assembly by a greater angle about the X than the Y nozzle axis is that nozzles and printhead ink channels can be placed more tightly together while leaving thin actuating walls 18 between adjacent ink channels behind the nozzles. By rocking each axis at appropriately selected frequencies a rectangular entry profile derived from a Lissajous envelope is produced. The oblate entry profile also provides for a higher surface tension pressure drawing the ink forward to the nozzle exit and so assisting with ink replenishment.

An assembly of undercut nozzles 13 made as described above is illustrated diagrammatically in FIG. 3. The action of the laser ablation process, particularly on a plastic material, in the nozzle bore surface makes the bore surface of higher surface energy or more positively wetting to the ink in nozzle 13. The high surface energy assists to urge the ink meniscus towards the nozzle exit face 25, thereby increasing ink drop acceleration and facilitating ink replenishment. Nozzle plate 14 may also be coated on its external face with a film or layer 31 of low surface energy material, such as fluoropolymer, prior to ablation. The film of low surface energy is known to prevent the spread of ink over the external face of nozzle plate 14 which assists to hold the ink drop size constant at different drop formation velocities and frequencies.

A line array of nozzles 13 can be exposed and formed in parallel on printhead 16 in a single operation. Also, a stack of array printheads 16 can be bonded to a common nozzle plate 16 for nozzle manufacture. Nozzles 13 are formed by mask 12 in locations which depend on the mask accuracy and do not depend on the accuracy of the assembly of the individual array printheads 16 of the stack one to another.

Nozzles 13 formed in nozzle plate 14 in one array need not necessarily be collinear. It may, for example, be advantageous to alternate nozzles 13 above and below the X—X axis, to compensate for a delay in the time of drop ejection, in the case where drops are ejected alternately from adjacent ink channels 20 of a shared actuator array printhead.

Figure 4:
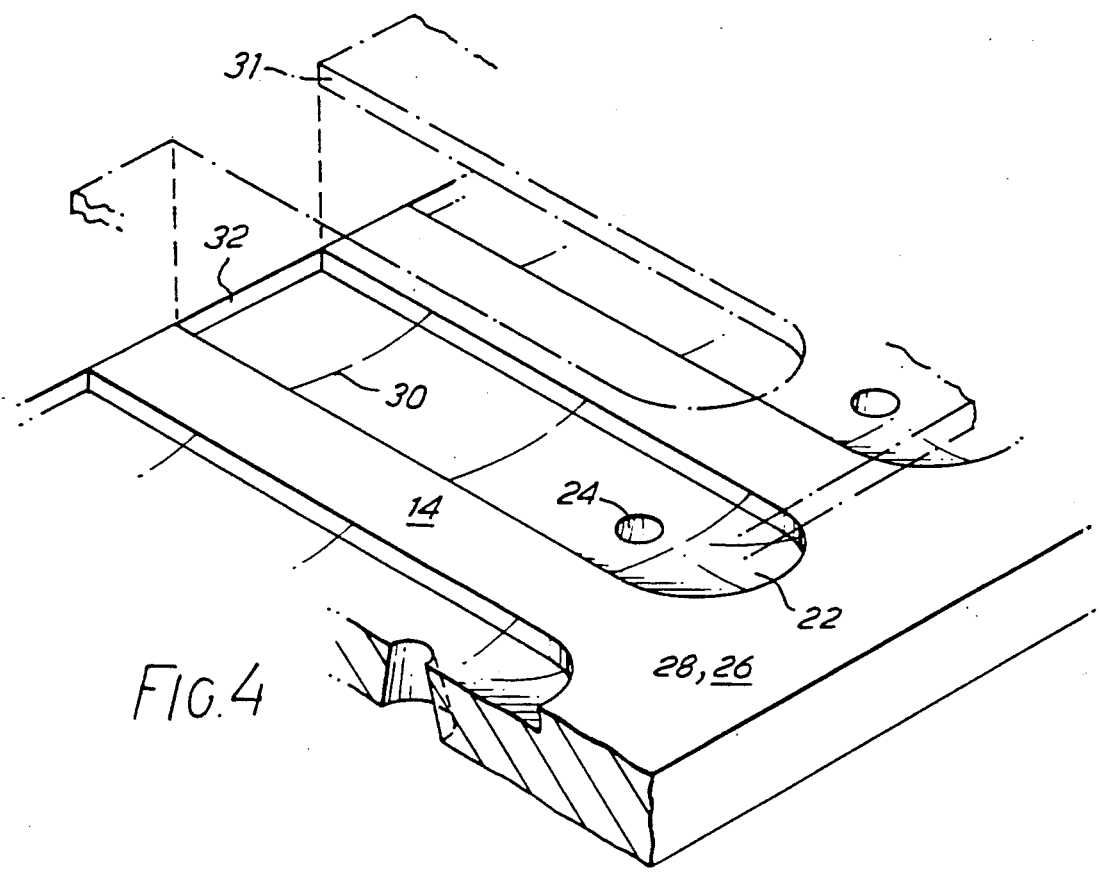
FIG. 4 is a perspective view of a nozzle plate manufactured according to the invention including an ink trough in the external face of the nozzle plate.
Figure 6:
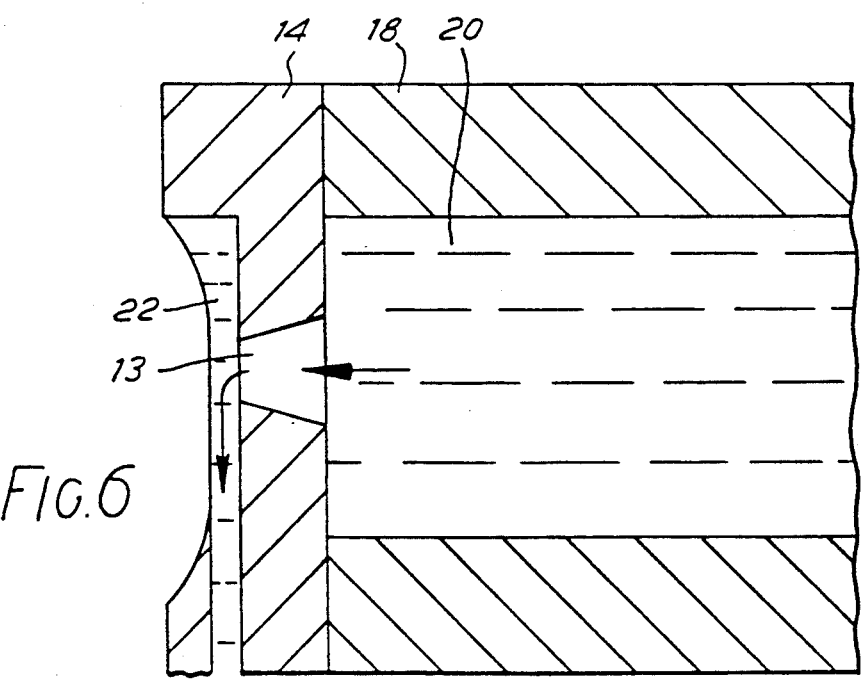
FIG. 6 is an enlarged view of a portion of the arrangement of FIG. 5.
Figure 5:
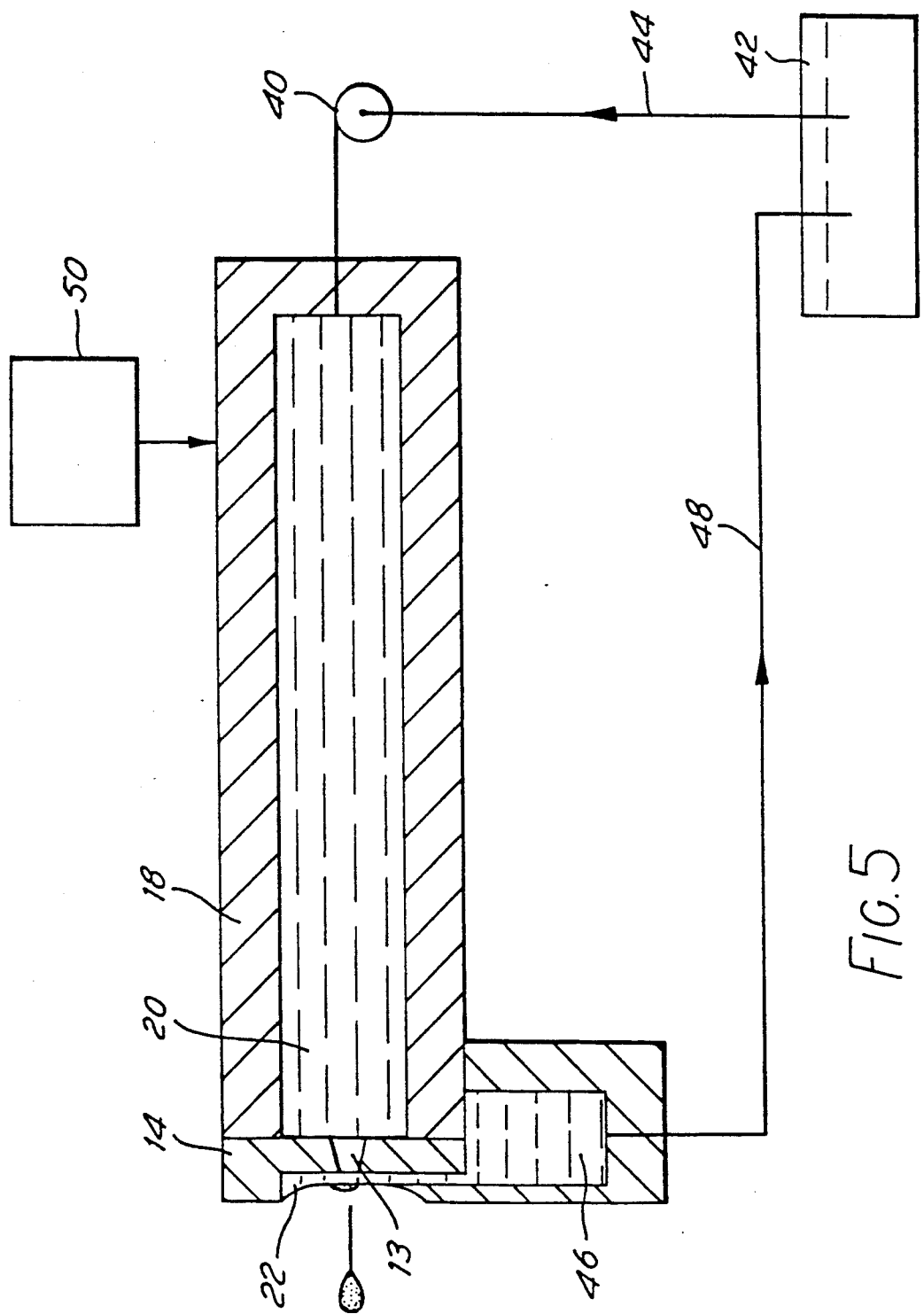
FIG. 5 is a diagrammatic elevation view illustrating the operation of a drop-on-demand ink jet printer having a nozzle plate with an external ink trough as shown in FIG. 4, and a system for maintaining a positive ink flow through the nozzles formed in the plate.

A further structure for holding ink on the outer face of nozzle plate 14, also made by laser ablation, is illustrated in FIGS. 4–6. In particular, a shallow trough 22 is cut by laser ablation in the exit surface 26 of nozzle plate 14 in a region covering a nozzle 24. A contact mask 31 (shown in exploded view in FIG. 4) is preferably used in the laser ablation process, which is generally similar to the process used in forming nozzles 13, although no rocking is employed. Also, exit surface 26 of nozzle plate 14 is preferably coated with a non-wetting film 28. The nozzle plate material in trough 22 after ablating the exit surface 26 is, however, hydro-philic, so that ink is attracted to form a meniscus 30 over the trough region covering nozzle 24. Ink is supplied to the troughs from an ink supply 32. The pressure of the supplied ink controls the level of the ink meniscus 30 in trough 22. Preferably, meniscus 30 is controlled so that the depth of the ink in trough 22 is one to two nozzle diameters.

The formation of ink meniscus 30 external to nozzle 24 has a number of advantages. Initially, maintaining ink external to nozzle 24 inhibits the withdrawal of air bubbles into ink channel 20 behind the nozzle. Secondly, the construction of trough 22 controls the thickness of the ink film external to nozzle 24. Such a film should be thin to maximize the acceleration of an ink drop ejected through the film from nozzle 24. In the ink trough arrangement, the ink supply 32 is available to admit ink to maintain the quantity of ink in trough 22 constant as successive ink drops are ejected by printhead 16. In one embodiment (FIG. 4), ink is provided only from the supply source 32 in front of nozzle plate 14 and no net flow of ink occurs through nozzle 24 or into the ink channel 20 behind nozzle 24 from a rear replenishment source.

In a further embodiment (see FIGS. 5–6), ink is supplied steadily into the ink channel 20 behind nozzle 24 by a pump 40 connected to an ink supply 42 by a line 44. The ink flows at a steady velocity, preferably 2.5–4.0 meters/second, through the nozzle into trough 22 formed in the front surface of the nozzle plate. The ink is then withdrawn from troughs 22 to an ink collection chamber 46 common to the troughs and returned to the supply by a line 48. This positive flow of ink through nozzle 24 has a number off advantages. The ink is more easily ejected since it has a positive flow velocity in the nozzles. A printer having ink flow of this type consequently may use an excitation source 50 operating at relatively low power to effect drop ejection. Another advantage is that ink is constantly being renewed in front of nozzle 24 and thereby has a greatly reduced tendency to form a dry film and thus inhibit ink drop ejection.

Nozzle plates of the type described above are readily manufactured in a plastic material by means of laser ablation. To make such a construction a double mask is required. The first mask is designed to expose the trough region external to each nozzle, where a depth of about 0.2–2 nozzle diameters is removed by laser ablation. A second mask is then interposed and the nozzle is then cut as previously described. Rocking of the assembly may also be effected to undercut the nozzle profiles. The wetting characteristics of the ablated surface in the trough, and the non-wetting characteristics of the unablated areas external to the trough serve to hold ink in a controlled manner external to the nozzle.

With the invention, a very convenient and accurate method for manufacturing nozzles for an ink jet printer is made available. It is recognized that numerous changes and modifications in the described embodiments of the invention may be made without departure from its true spirit and scope. The invention is to be limited only as defined in the claims.

What is claimed is:

1. A method of making a nozzle plate for an ink jet printhead comprising the steps of:

directing a pulse high energy beam at a surface of said plate to impinge on said surface and remove material from the plate; and relatively rocking the plate and the beam about an axis normal to the axis of the nozzle so that said nozzle is formed progressively with a bore which extends through said plate and tapers towards an outlet end thereof in a direction opposed to that of the beam.

2. The method of claim 1 wherein said rocking step comprises effecting relative rocking between said plate and said beam about each of two axes normal to the axis of the nozzle mutually inclined at right angles at respective different frequencies so that said nozzle is formed in said plate so as to diverge in the direction of said beam with an end thereof at the side of the plate remote from the side on which said beam is incident of predetermined shape.

3. The method of claim 2 wherein said rocking step is adapted to form said nozzle with the end thereof at the side of the plate remote from the side thereof on which said beam is incident of a shape substantially to match the cross-section of an ink channel with which said nozzle is intended to communicate.

4. The method of claim 1 wherein said rocking step comprises effecting relative rocking motion about each of two mutually inclined axes so that said nozzle is formed with one end thereof of larger cross-section and with a predetermined shape.

5. The method of claim 4 wherein said rocking step comprises disposing said axes mutually at right angles.

6. The method of claim 5 wherein said rocking step comprises relatively rocking said plate and said beam by holding said beam stationary and pivotally moving said plate in simple harmonic motion about each of said axes, with said axes disposed in or substantially in a plane surface of said plate facing towards said beam.

7. The method of claim 1 including forming said nozzle with an excimer laser beam as said high energy beam.

8. The method of claim 7 including the further step of forming said plate from a polymer material.

9. The method of claim 1 including the further step of securing a masking means in overlying contact with said plate to limit incidence on said plate of said beam to a location at which said nozzle is to be formed.

10. The method of forming a nozzle in a printhead which comprises a nozzle plate of polymer material and an ink channel to which said plate is secured, said method comprising the steps of:
    directing a pulsed high energy beam to impinge on the side of the plate remote from said channel and remove material from the plate thereby to form said nozzle progressively from the outlet end to the inlet end thereof; and
    relatively rocking the printhead and the beam about an axis normal to the axis of the nozzle thereby to form said nozzle with a bore which tapers in a direction opposed to that of the beam and which communicates at the inlet end thereof with said channel.

11. The method of claim 10 wherein said ink channel is a rectilinear channel, and said method includes the further step of directing said beam at said plate along the axis of said channel to form said nozzle.

12. The method of claim 10 in which said printhead comprises a plate of polymer material and a body formed with a plurality of parallel ink channels to which said plate is secured to close corresponding ends of said channels, said method including the further step of limiting the incidence on said plate of said beam to a plurality of locations respectively aligned with said channels at each of which a respective nozzle is to be formed and effecting said relative rocking motion between said beam and said printhead so as to simultaneously form said nozzles each of tapering form.

13. A method of making nozzles in a nozzle plate of polymer material secured to a printhead of an ink jet printer at corresponding ends of parallel ink channels formed in said printhead, comprising the steps of:
    directing a pulse high energy beam at the plate progressively to remove material therefrom;
    limiting the incidence on said plate of said beam to a plurality of locations at which respective nozzles are to be formed; and
    effecting rocking of said plate, while holding said beam stationary, about two axes normal to the axis of the nozzles disposed mutually at right angles so as to form a plurality of nozzles in said plate respectively communicating with said channels and tapering in a direction opposed to that of said beam and having adjacent the printhead channels a first dimension in the direction of the spacing of said nozzles and a second dimension perpendicular to and greater than said first dimension.

14. The method of claim 13 wherein said rocking step comprises rocking said plate about said axes so as to form said nozzles with the ends thereof of greater cross-sectional area of substantially rectangular form.

15. The method of claim 13 wherein said rocking step comprises effecting rocking of said plate in simple harmonic motion about each of said axes.

16. A method of making a nozzle plate for an ink jet printhead comprising the steps of:
    directing a pulse high energy beam at a plate to form a trough in said plate by application of said beam directly to said plate to remove material from said plate;
    directing said high energy beam at a location within said trough to remove material from said plate at said location; and
    effecting relative rocking motion between said plate and said beam about an axis normal to the axis of the nozzle thereby progressively to form by application of said beam directly to said plate a nozzle in said plate which tapers in a direction opposed to the direction of said beam, the end of said nozzle opening into said trough being of smaller cross-sectional area than the opposite end of the nozzle.

17. The method of claim 16 including the further steps of:
    employing first masking means to limit the incidence on said plate of said beam to an area at which said trough is formed; and
    employing second masking means to limit the incidence of said beam to an area in said trough at which said nozzle is formed.

18. The method of claim 16 wherein said rocking step comprises effecting said rocking motion by holding said beam stationary and pivotally moving said plate in simple harmonic motion about respective axes disposed in or substantially in a plane surface of said plate facing towards said beam.

19. The method of claim 18 further including the steps of:
    forming said plate in a polymer material; and
    prior to forming said nozzle, mounting said plate on an ink jet printhead body so as to close an end of an ink channel in said body, said nozzle being formed to communicate with said channel.

20. A nozzle plate for an ink jet printhead comprising a plate of polymer material formed with a tapering nozzle having in respective opposite surfaces of the plate an inlet and an outlet of smaller cross-sectional area than said inlet and a nozzle bore between said inlet and said outlet formed progressively from said outlet to said inlet by directing a pulsed high energy beam at said plate to impinge on and remove material from said plate and effecting relative rocking motion between said plate and said beam about an axis normal to the axis of the nozzle thereby progressively to form said nozzle bore so as to taper in a direction opposed to the direction of said beam.

21. The nozzle plate of claim 20 wherein said nozzle inlet is of substantially rectangular cross-section and is formed by simple harmonic rocking motion of said plate relative to said beam about two mutually perpendicular axes.

22. The nozzle plate of claim 20 wherein said plate is formed with a trough at the outlet end of said nozzle bore and into which said nozzle bore opens and which, prior to formation of said nozzle bore, is formed by directing said high energy beam at said plate, and including means for supplying ink for retention in said trough.

23. A drop-on-demand ink jet printhead comprising a printhead body formed with an ink channel and a nozzle plate of polymer material secured to said body and including a nozzle communicating with said channel, wherein said nozzle has an inlet communicating with said channel, an outlet in the face of said plate remote from said body which is of smaller cross-sectional area than said inlet and a nozzle bore between said inlet and said outlet formed by progressively removing material from said plate by causing a pulsed high energy beam to impinge directly on the side of said plate remote from said body and effecting relative rocking motion between said printhead and said beam about an axis normal to the axis of the nozzle so that said nozzle bore tapers in a direction opposed to that of said beam.

24. The printhead of claim 23 wherein said nozzle bore is formed by effecting relative rocking motion between said plate and said beam about each of two intersecting axes.

25. The printhead of claim 24 wherein said nozzle inlet is of substantially rectangular cross-section and is formed by simple harmonic rocking motion of said plate relative to said beam about two mutually perpendicular axes.

26. The printhead of claim 25 wherein said nozzle bore is formed by a laser beam.

27. The printhead of claim 26 wherein said bore is formed by an excimer laser beam.

28. The printhead of claim 23 wherein said plate is formed with a trough at the outlet end of said nozzle bore and into which said nozzle bore opens and which, prior to formation of said nozzle bore, is formed by directing said high energy beam at said plate, and including means for supplying ink for retention in said trough.

29. The printhead of claim 28 wherein said trough and said nozzle bore are formed by a laser beam.

30. The printhead of claim 29 wherein said trough and said nozzle bore are formed by an excimer laser beam.

31. A nozzle plate for a drop-on-demand ink jet printhead comprising a nozzle plate having a row of nozzles formed therein for respectively communicating with the ink channels of a printhead body, wherein each of said nozzles is formed with an inlet for communicating with a corresponding one of said channels, an outlet in the face of said plate remote from said inlet and a nozzle bore between said inlet and said outlet formed progressively from said outlet to said inlet by directing a pulsed high energy beam to impinge on and remove material from said plate while effecting relative rocking motion between said nozzle plate and said beam about an axis normal to the axis of the nozzle so that said nozzle bore tapers in a direction opposed to that of said beam.

32. The printhead of claim 31 wherein the inlet of each of said nozzles is of substantially rectangular cross-section and is formed by simple harmonic rocking motion of said plate relative to said beam about two mutually perpendicular axes in the plane of the plate facing the beam, a first dimension of each of said cross-sections in the direction of the row of nozzles being less than a second dimension thereof perpendicular to said row.

33. The printhead of claim 31 wherein said plate is formed with respective troughs at the outlet end of each of said nozzle bores and into which said nozzle bores open and which, prior to formation of said nozzle bores, are formed by directing said high energy beam at said plate and including means for supplying ink for retention in said troughs.

34. A drop-on-demand ink jet printhead comprising a printhead body having an array of ink channels and a nozzle plate of polymer materials secured to said body and having a row of nozzles formed therein respectively communicating with said channels, and wherein each of said nozzles is formed with an inlet communicating with a corresponding one of said channels, an outlet in the face of said plate remote from said inlet and a nozzle bore which converges from said inlet to said outlet and is formed progressively from said outlet to said inlet by directing a pulsed high energy beam to impinge on and remove material from said plate while effecting relative rocking motion between said plate and said beam about an axis normal to the axis of the nozzle so that said nozzle bore tapers in a direction opposed to that of said beam.

35. The printhead of claim 34 wherein the inlet of each of said nozzles is of substantially rectangular cross-section and is formed by simple harmonic rocking motion of said plate relative to said beam about two mutually perpendicular axes, a first dimension of each of said cross-sections in the direction of the row of nozzles being less than a second dimension thereof perpendicular to the row.

36. The printhead of claim 35 wherein the bores of said nozzles are formed by a laser beam.

37. The printhead of claim 36 wherein the bores of said nozzles are formed by an excimer laser beam.

38. The printhead of claim 34 wherein said plate is formed with a respective trough at the outlet end of each of said nozzle bores and into which said nozzle bores open and which, prior to formation of said nozzle bores, are formed by directing a high energy beam at said plate, and including means for supplying ink for retention in said trough.

* * * * *